United States Patent [19]

Ray

[11] Patent Number: 5,348,601
[45] Date of Patent: Sep. 20, 1994

[54] METHOD OF MAKING AN OFFSET CORRUGATED SANDWICH CONSTRUCTION

[75] Inventor: Hemen Ray, Perkasie, Pa.

[73] Assignee: The United States of America as represented by the Secretary of the Navy, Washington, D.C.

[21] Appl. No.: 82,068

[22] Filed: Jun. 23, 1993

[51] Int. Cl.⁵ .............................................. B29C 53/22
[52] U.S. Cl. .................................... 156/155; 156/210; 156/292; 264/258; 264/313; 264/DIG. 44
[58] Field of Search ............... 156/155, 204, 210, 292; 428/116, 118, 179, 181, 185, 186; 52/795, 799, 800, 807; 264/DIG. 44, 257, 258, 313; 249/61

[56] References Cited

U.S. PATENT DOCUMENTS

| | | | |
|---|---|---|---|
| 2,454,719 | 11/1948 | Scogland | 156/155 |
| 3,376,684 | 4/1968 | Cole et al. | 52/799 |
| 3,542,636 | 11/1970 | Wandel . | |
| 3,574,103 | 4/1971 | Latkin . | |
| 3,755,037 | 8/1973 | Erwin et al. | 264/313 |
| 3,795,559 | 3/1974 | Horn et al. | 264/313 |
| 3,869,778 | 3/1975 | Yancey | 52/800 |
| 4,472,473 | 9/1984 | Davis et al. . | |
| 4,769,968 | 9/1988 | Davis et al. . | |
| 5,028,474 | 7/1991 | Czaplicki . | |
| 5,128,195 | 7/1992 | Hegedus | 428/116 |
| 5,162,143 | 11/1992 | Porter et al. . | |

FOREIGN PATENT DOCUMENTS 284848 10/1988 European Pat. Off. ............ 428/118

Primary Examiner—Michael W. Ball
Assistant Examiner—Steven D. Maki
Attorney, Agent, or Firm—James V. Tura; James B. Bechtel; Susan E. Verona

[57] ABSTRACT

A method for making an offset corrugated core sandwich construction is disclosed. Mandrels of preestablished form and size are arranged into a pattern in a confined area. After covering the mandrels with a release film, strips of pliable, uncured composite material are arranged in a "peak-to-valley" pattern with adjacent strips being out of phase by 180 degrees. Selected mandrels are replaced by a granular mixture and top and bottom face sheets are fitted to the arrangement. After curing, all mandrels are removed from the construction.

2 Claims, 1 Drawing Sheet

METHOD OF MAKING AN OFFSET CORRUGATED SANDWICH CONSTRUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a method for making sandwich constructions suitable for use in structural and non-structural members, and more particularly to sandwich constructions of low-density cores bonded between thin-gauge, high-strength face sheets for use in a wide range of military, industrial and commercial components.

Sandwich constructions are finding broad application as structural and non-structural members in boats, aircraft, furniture, appliances, and other items requiring high strength, light-weight materials. They typically include face sheets bonded to either side of a low density core and can be made of such materials as metals, plastics or composite fiberglass laminates for rigidity and strength. Among the various core materials are rigid plastic foams, honeycombs, truss-core corrugations and an arrangement of adjacent, inclined rectangular-shaped facets connected by intermediate rows of adjoining parallelagram-shaped facets.

In aircraft design, the need for weight efficiency and aerodynamically smooth surfaces under high stress levels has stimulated use of sandwich construction as a possible substitute for the conventional sheet-stringer construction. Notwithstanding the superior weight-efficiency of the sandwich constructions, their general acceptance for critical applications has lagged behind theoretical development primarily because of maintenance problems experienced in service. Honeycomb core sandwich constructions, for instance, are considered to be among the most weight-efficient but, due to their tendency to retain moisture which may become entrapped due to ineffective edge seals or unbonding of face sheets from the core. This may degrade the structural integrity and lead to extensive corrosion and premature failure of components. Experience has shown a significant frequency of repairs on replacements which are very time-consuming and expensive.

SUMMARY OF THE INVENTION

Accordingly, an object of the present invention is to provide a method of making a sandwich construction having a high strength-to-weight efficiency suitable for a broad variety of military, industrial and commercial applications.

Another object is to provide a method of making a low-density core sandwich construction in which corrosion and degradation of structural integrity due to retention of moisture is substantially eliminated.

Another object is to provide a method of making a sandwich construction in which unbonding of face sheets from the core is substantially reduced or eliminated when heat, pressure or vacuum is applied for purposes of repair.

Still another object is to provide a method of making a sandwich construction having a flexible core with structural discontinuities for improved tolerance for damage.

These and other objects of the present invention are achieved in a novel and unobvious way of making a sandwich construction with an offset corrugated sandwich core. Hexagonal and triangular mandrels are arranged into a preestablished design in a confined area. Each mandrel is then covered with a thin, plastic release film and then a first strip of pliable, uncured composite material is arranged over and around the mandrels across the confined area, creating flat-topped crests and troughs. Subsequent strips of material are arranged adjacent thereto but offset from one another, or out of phase by 180 degrees, so that a crest of one is adjacent a trough of the next, and vice versa. Top and bottom face sheets are placed on to the surfaces of the crests and the troughs and then selected mandrels are replaced by a granular mixture. Next, a curing operation, as per given instructions, causes all surfaces to bond together. All mandrels are removed to show an offset corrugated sandwich core construction.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

DETAILED DESCRIPTION OF THE PREFERRED EMBODIMENT

Figure 1:
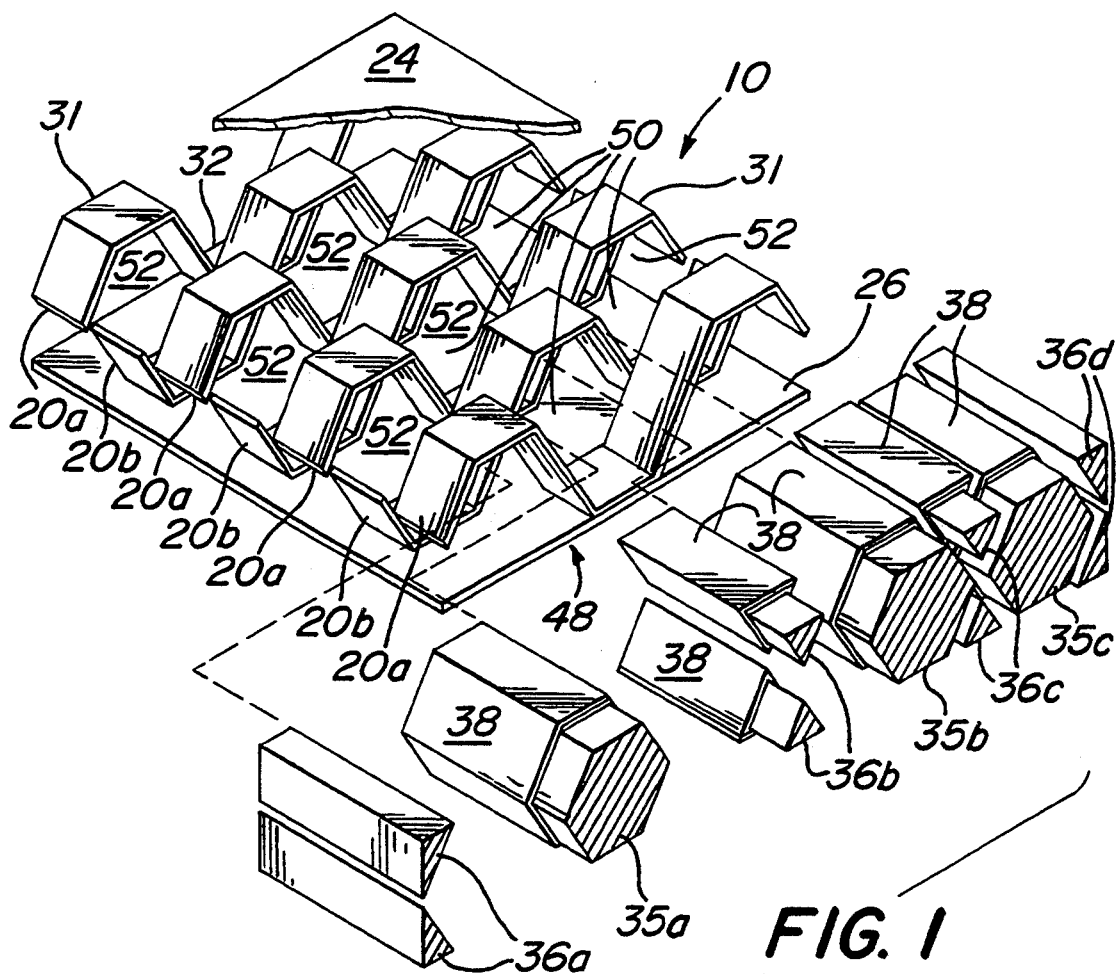
FIG. 1 is a perspective view, partially expanded, of a series of mandrels and an offset, corrugated sandwich construction.

The first steps toward fabricating construction 10 involve obtaining hexagonal and triangular solid mandrels 35 and 36, respectively, and wrapping each in a thin, plastic release film 38, as is known. Mandrels 35 are arranged in parallel rows on facesheet 26 and a first strip 20a of pliable composite material is wrapped, alternatively over mandrel 35a and then under mandrel 35b and then back over mandrel 35c. This wrapping technique creates crests 31 and troughs 32. The strips of composite can be one-half inch in width and will vary in length depending upon the size of the article desired. In the particular embodiment described, only three hexagonal mandrels 35 are shown, but it will be understood that any number can be used.

When the next strip 20b is set into construction 10, first a trough 32, then a crest 31, then a trough 32 is formed. Subsequent strips are placed in construction 10 in like manner and mandrels 36 are then placed into the appropriate cavities. In this fashion, each strip is approximately 180° out of phase with the previous one, so that a crest is adjacent a trough, and so on.

Figure 2:
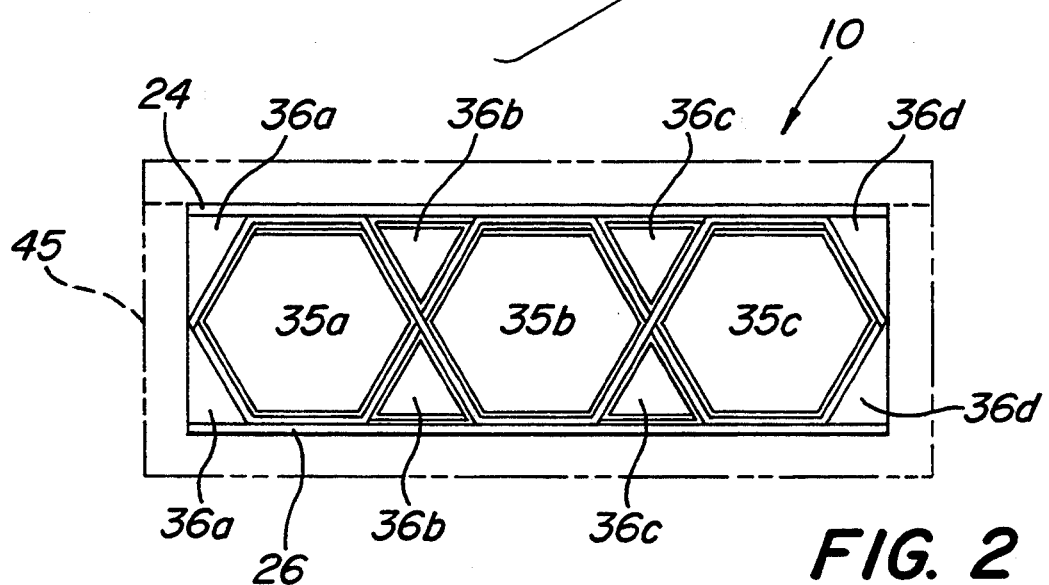
FIG. 2 is a elevation view of an end of the sandwich construction of FIG. 1 with the mandrels removed.

Once construction 10 is in this intermediate state, it is placed inside a suitable stiff cavity 45 (shown in phantom in FIG. 2) and a top facesheet 24 placed thereupon and only the front end 48 is left uncovered. Then each of solid hexagonal mandrels 35 and triangular mandrels 36b, 36c are removed one at a time without removing the respective release sheets wrapped therearound. Next, each of the newly formed cavities is packed with a suitable granular mixture, such as glass beads and a PTFE powder, to form a granular mandrel. The remaining open end 48 is now closed and construction 10 is cured in accordance with known procedures. Once the curing operation is complete, the walls of cavity 45 the granular mandrels and the release films 38 are all removed thus forming an offset corrugated core sandwich construction.

The above-described method of fabrication had many advantages over the prior art. For one, many passageways 50 between individual cell 52 allow moisture to drain from construction 10. For another, fabrication of construction 10 by one cocuring operation, without any secondary bonding, eliminates problems related to secondary bonding such as unbonding of face sheets 24, 26 from the core. Finally, the presence of passageways 50 and cocured components eliminates unbonding of the facesheets from the core from heat or pressure during a repair process.

Finally, while the method of construction of an offset corrugated sandwich construction has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What I claim is:

1. A method for making an off-set corrugated core sandwich construction comprising the steps of:

placing shaping mandrels into a prearranged pattern wherein each mandrel has an exterior surface;

wrapping a release film over the exterior surface of each of said mandrels;

arranging a first strip of pliable composite material to bend over and around said mandrels to from alternating crests and troughs;

arranging subsequent strips of pliable composite material to form alternating crests and troughs wherein each strip is approximately 180° out of phase with an adjacent strip;

attaching a face sheet to the crests of the strips and attaching a face sheet to the troughs of the strips to form an off-set corrugated core sandwich construction;

replacing selected of said mandrels with a granular mixture;

curing the construction; and removing the granular mixture and release films.

2. The method according to claim 1 wherein said shaping mandrels are hexagonal and triangular solid forms.

* * * * *